(12) United States Patent
Evans

(10) Patent No.: US 7,163,243 B2
(45) Date of Patent: Jan. 16, 2007

(54) BUMPER FOR PEDESTRIAN IMPACT HAVING THERMOFORMED ENERGY ABSORBER

(75) Inventor: Darin Evans, Spring Lake, MI (US)

(73) Assignee: NetShape international, LLC, Novi, MI (US)

(*) Notice: Subject to any disclaimer, the term of this patent is extended or adjusted under 35 U.S.C. 154(b) by 0 days.

(21) Appl. No.: 11/299,927

(22) Filed: Dec. 12, 2005

(65) Prior Publication Data

US 2006/0125250 A1    Jun. 15, 2006

Related U.S. Application Data

(60) Provisional application No. 60/635,655, filed on Dec. 13, 2004.

(51) Int. Cl.
*B60R 19/18* (2006.01)
*B60R 21/34* (2006.01)

(52) U.S. Cl. .............. 293/121; 293/133; 296/187.03; 296/187.04; 296/187.09

(58) Field of Classification Search ........ 293/120–122, 293/132, 133; 296/187.03, 187.04, 187.09, 296/187.11
See application file for complete search history.

(56) References Cited

U.S. PATENT DOCUMENTS

| | | | |
|---|---|---|---|
| 3,231,454 A | 1/1966 | Williams | |
| 3,577,305 A | 5/1971 | Hines et al. | |
| 3,695,665 A | 10/1972 | Matsuura | |
| 3,746,605 A | 7/1973 | Dillon et al. | |
| 3,747,968 A | 7/1973 | Hornsby | |
| 3,768,850 A | 10/1973 | Barton et al. | |
| 3,782,767 A | 1/1974 | Moore | |
| 3,782,768 A | 1/1974 | Moore | |
| 3,810,668 A | 5/1974 | Kornhauser | |
| 3,837,991 A | 9/1974 | Evans | |
| 3,885,074 A | 5/1975 | Chandler | |
| 3,900,222 A | 8/1975 | Muller | |
| 3,900,356 A | 8/1975 | Koch et al. | |
| 3,902,748 A | 9/1975 | Bank et al. | |
| 3,933,387 A * | 1/1976 | Salloum et al. | ............. 293/120 |
| 3,938,841 A | 2/1976 | Glance et al. | |
| 3,971,583 A | 7/1976 | Kornhauser | |
| 4,050,689 A | 9/1977 | Barton et al. | |
| 4,061,385 A | 12/1977 | Schwartzberg | |
| 4,070,052 A | 1/1978 | Ng | |
| 4,076,872 A | 2/1978 | Lewicki et al. | |
| 4,096,306 A | 6/1978 | Larson | |

(Continued)

FOREIGN PATENT DOCUMENTS

WO    WO 96/06288    8/1994

*Primary Examiner*—Dennis H. Pedder
*Assistant Examiner*—Greg Blankenship
(74) *Attorney, Agent, or Firm*—Price Heneveld Cooper DeWitt & Litton LLP

(57) ABSTRACT

A vehicle bumper system includes a beam and a thermoformed energy absorber positioned on a face of the beam. The thermoformed energy absorber has a plurality of elongated crush boxes thermoformed from a base flange. Crush boxes near a center of the beam are up to about three inches deep, and as a result have side walls that are stretched when thermoformed, while crush boxes near ends of the beam are much shorter and hence not as thin. As a result, the center area has a softer impact intended to reduce pedestrian injury during impact.

11 Claims, 8 Drawing Sheets

U.S. PATENT DOCUMENTS

| | | | |
|---|---|---|---|
| 4,287,250 A | 9/1981 | Rudy | |
| 4,314,865 A | 2/1982 | Ottaviano | |
| 4,344,536 A | 8/1982 | Oberhuber | |
| 4,427,474 A | 1/1984 | Ottaviano | |
| 4,533,583 A | 8/1985 | May | |
| 4,551,379 A | 11/1985 | Kerr | |
| 4,597,601 A | 7/1986 | Manning | |
| 4,631,221 A | 12/1986 | Disselbeck | |
| 4,890,877 A | 1/1990 | Ashtiani-Zarandi et al. | |
| 4,995,659 A | 2/1991 | Park | |
| 5,030,501 A | 7/1991 | Colvin et al. | |
| 5,042,859 A | 8/1991 | Zhang et al. | |
| 5,098,124 A | 3/1992 | Breed et al. | |
| 5,106,137 A | 4/1992 | Curtis | |
| 5,141,279 A | 8/1992 | Weller | |
| 5,152,023 A | 10/1992 | Graebe | |
| 5,243,722 A | 9/1993 | Gusakov | |
| 5,356,177 A | 10/1994 | Weller | |
| 5,431,463 A | 7/1995 | Chou | |
| 5,564,535 A | 10/1996 | Kanianthra | |
| 5,596,781 A | 1/1997 | Graebe | |
| 5,651,569 A | 7/1997 | Molnar | |
| 5,851,626 A | 12/1998 | McCorry et al. | |
| 6,017,084 A | 1/2000 | Carroll, III | |
| 6,082,792 A * | 7/2000 | Evans et al. | 293/133 |
| 6,199,942 B1 | 3/2001 | Carroll, III | |
| 6,234,526 B1 | 5/2001 | Song et al. | |
| 6,247,745 B1 | 6/2001 | Carroll, III et al. | |
| 6,315,339 B1 | 11/2001 | Devilliers et al. | |
| 6,375,251 B1 | 4/2002 | Taghaddos | |
| 6,406,079 B1 | 6/2002 | Tamada et al. | |
| 6,406,081 B1 | 6/2002 | Mahfet et al. | |
| 6,435,579 B1 | 8/2002 | Glance | |
| 6,443,513 B1 | 9/2002 | Glance | |
| 6,609,740 B1 * | 8/2003 | Evans | 293/121 |
| 6,644,701 B1 | 11/2003 | Weissenborn et al. | |
| 6,679,967 B1 | 1/2004 | Carroll, III | |
| 6,681,907 B1 | 1/2004 | Le | |
| 6,682,128 B1 | 1/2004 | Carroll, III et al. | |
| 6,726,262 B1 * | 4/2004 | Marijnissen et al. | 293/121 |
| 6,866,313 B1 * | 3/2005 | Mooijman et al. | 293/120 |
| 6,923,494 B1 * | 8/2005 | Shuler et al. | 296/187.05 |
| 2002/0005644 A1 | 1/2002 | Tamada et al. | |
| 2002/0017805 A1 * | 2/2002 | Carroll et al. | 296/189 |
| 2002/0060462 A1 | 5/2002 | Glance | |
| 2002/0070584 A1 | 6/2002 | Carroll, III | |
| 2002/0149213 A1 | 10/2002 | Weissenborn | |
| 2002/0149214 A1 | 10/2002 | Evans | |
| 2003/0047952 A1 | 3/2003 | Trappe | |

* cited by examiner

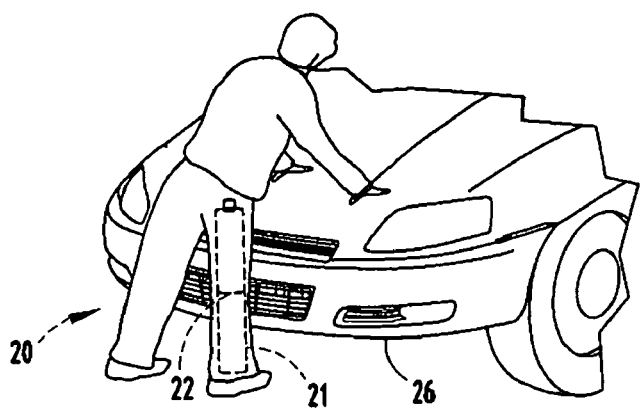
FIG. 1
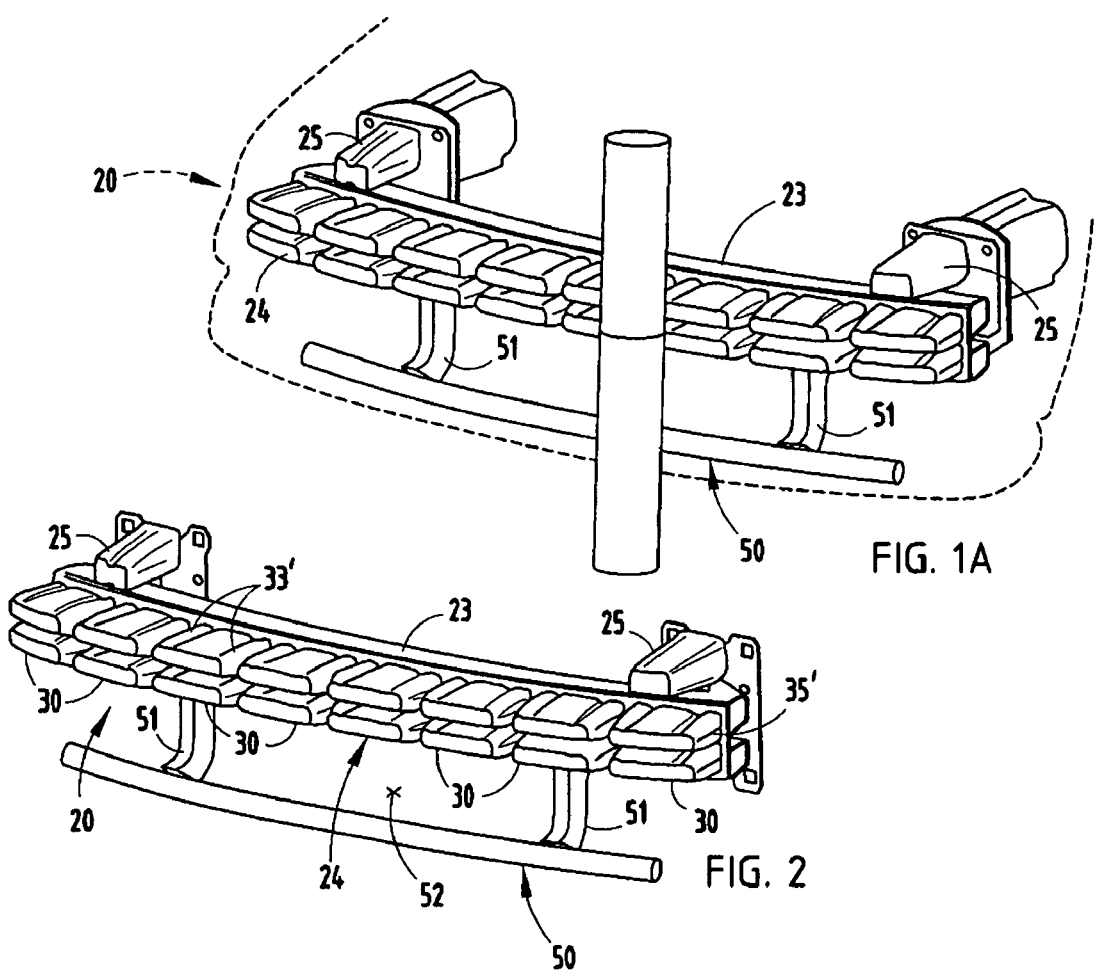
FIG. 1A
FIG. 2
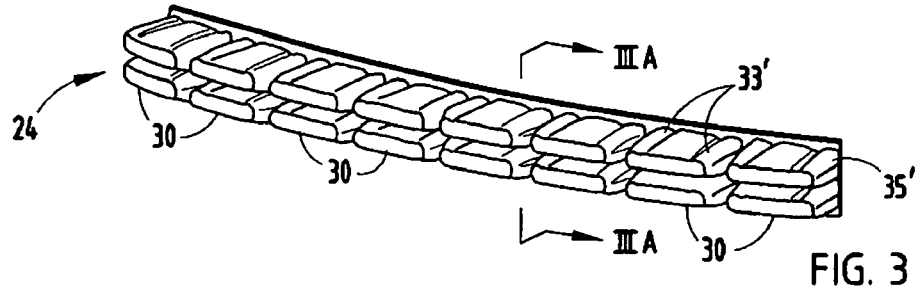
FIG. 3

BUMPER FOR PEDESTRIAN IMPACT HAVING THERMOFORMED ENERGY ABSORBER

CROSS-REFERENCE TO RELATED APPLICATIONS

This application claims benefit of provisional application Ser. No. 60/635,655, filed Dec. 13, 2004, entitled BUMPER FOR PEDESTRIAN IMPACT HAVING THERMOFORMED ENERGY ABSORBER, the entire contents of which are incorporated herein in their entirety.

BACKGROUND

The present invention relates to vehicle bumper systems configured to reducing injury to pedestrians upon impact.

Modern bumper systems are designed to absorb a maximum of impact energy over a given stroke. At the same time, they are designed to minimize load spikes, and to distribute energy in a manner promoting uniform and predictable collapse upon undergoing a vehicle crash. Every millimeter of space is important to energy absorption, even spaces of 10 mm or less. Further, the individual components of an energy-absorbing system must combine well with other energy-absorbing components, e.g., metal tubular beams and non-tubular channels, injection-molded "honeycomb" energy absorbers, foam "block" energy absorbers, hydraulic shock absorbers, crush towers and mounts, and various combinations thereof. At the same time, light weight must be maintained. Also, it is desirable to maintain an ability to customize energy absorption at selected impact zones (e.g., at a corner of the vehicle or at a center impact, such as with a pedestrian impact). Concurrently, all components of a bumper system must be flexible and able to conform to an aerodynamic sweeping curvature of a vehicle front.

Notably, thermoformed parts have not been used much on exterior bumper systems for modern passenger vehicles, since energy absorbers are usually injection-molded to be relatively deep parts (such as about 40 mm or more deep) and include significant wall thickness (e.g., 3 mm or greater wall thickness) in order to provide a good crush stroke and energy absorption during impact. Further, most injection-molded energy absorbers made of solid polymer are relatively complex parts with undercut surfaces, varied wall thicknesses, and different wall spacings to provide optimal energy absorption in different regions of the energy absorbers. This is directly in opposition to thermoformed parts, which are traditionally limited to shorter depths, relatively thin wall thicknesses, and no undercut/blind surfaces. Thus, for years, original equipment manufacturers of passenger vehicles have avoided using thermoformed parts, despite the fact that thermoformed molds generally cost less, require shorter lead times, provide faster cycle times, have lower thermal energy use, generate less waste, and are more environmentally friendly processes. Skilled artisans in bumper design have apparently not fully realized the unexpected added benefits that thermoformed parts can offer when combined with other energy absorbing systems and components.

Thus, a system having the aforementioned advantages and solving the aforementioned problems is desired.

SUMMARY OF THE PRESENT INVENTION

In one aspect of the present invention, a bumper system for vehicles includes a beam and a thermoformed energy absorber positioned on a face of the beam. The thermoformed energy absorber has a base flange, and has a plurality of spaced-apart crush boxes thermoformed from the base flange. Some of the crush boxes are near a center of the beam and are designed for center impact, and others of the crush boxes are near ends of the beam and have a different shape designed for corner impact. The crush boxes each include a front section spaced from the base flange and include top, bottom, and fore-aft-extending side walls that extend from the front section to the base flange. The walls have a reduced thickness due to being stretched when thermoformed, with at least some of the walls having a side thickness less than half of a thickness of the base flange.

In another aspect of the present invention, a bumper system for vehicles includes a beam and a thermoformed energy absorber positioned on a face of the beam. The thermoformed energy absorber has a base flange, and has a plurality of spaced-apart crush boxes thermoformed from the base flange. The crush boxes each include a front section spaced from the base flange and include top, bottom, and fore-aft-extending side walls that extend from the front section to the base flange. Some of the crush boxes are longitudinally-elongated to have a length at least three times a vertical dimension of the crush boxes.

In yet another aspect of the present invention, a bumper system for vehicles includes a beam and a thermoformed energy absorber positioned on a face of the beam. The thermoformed energy absorber has a base flange, and has a plurality of spaced-apart crush boxes thermoformed from the base flange. The crush boxes are longitudinally elongated to at least three times their width. Some of the crush boxes are near a center of the beam and extend forward of the beam a first distance in height, and some of the crush boxes are near ends of the beam and extend forward of the beam a second distance in height, the first distance being at least double the second distance. The crush boxes each include a front section spaced from the base flange and including top, bottom, and fore-aft-extending side walls that extend from the front section to the base flange. The side walls have a non-constant thickness and are tapered in shape due to being stretched when thermoformed, the crush boxes near the center of the beam that are the first distance in height having a front portion of the fore-aft-extending walls that is less than about half of a thickness of the base flange. The crush boxes near the ends of the beam that are a second distance in height have a thicker cross section than the crush boxes near the center, such that the center area has a softer impact intended to reduce pedestrian injury during impact.

These and other aspects, objects, and features of the present invention will be understood and appreciated by those skilled in the art upon studying the following specification, claims, and appended drawings.

BRIEF DESCRIPTION OF DRAWINGS

FIG. 1 is a perspective view illustrating a vehicle front end impacting a pedestrian, the front end including a bumper system embodying the present invention;

FIG. 1A is a perspective view similar to FIG. 1, but showing only one leg of the pedestrian and with the fascia removed from the vehicle to better show the bumper system;

FIG. 2 is a perspective view of the bumper system of FIG. 1A;

FIG. 3 is a perspective view of the thermoformed energy absorber of FIG. 2.

DETAILED DESCRIPTION OF PREFERRED EMBODIMENTS

Figure 3A:
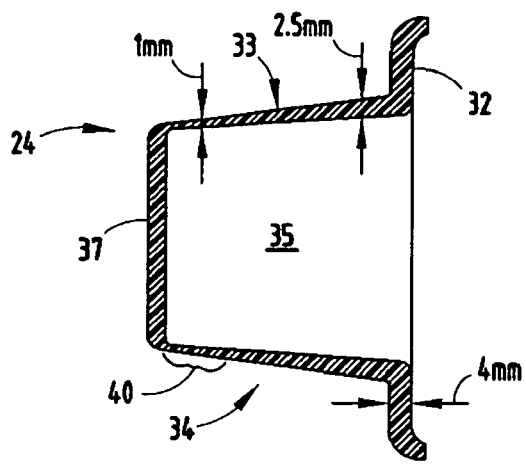
FIG. 3A is a cross section taken vertically along the line III—III in FIG. 3.

A vehicle bumper system 20 (FIG. 1) is configured to provide an improvement where pedestrian injury due to impact is reduced, such as injury to the pedestrian's leg 21 especially at his or her knee 22. The bumper system 20 includes a beam 23 and a thermoformed energy absorber 24 positioned on a face of the beam 23. The beam 23 is mounted to a vehicle frame by mounts 25, and the beam 23 and energy absorber 24 are configured to support fascia 26 that aesthetically covers the vehicle front end.

Figure 4:
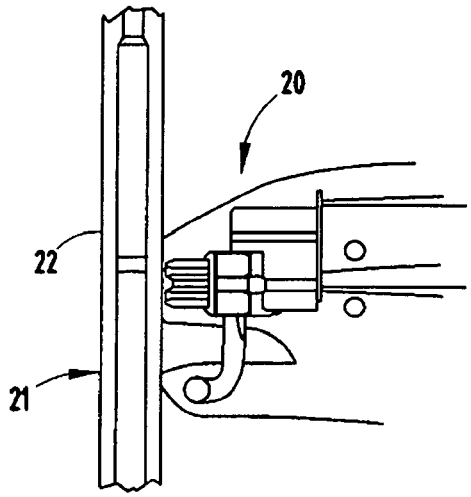
FIGS. 4–7 are cross sections taken through the bumper system of FIG. 1, the views being taken during impact against the pedestrian's leg and showing a progression of the impact.
Figure 5:
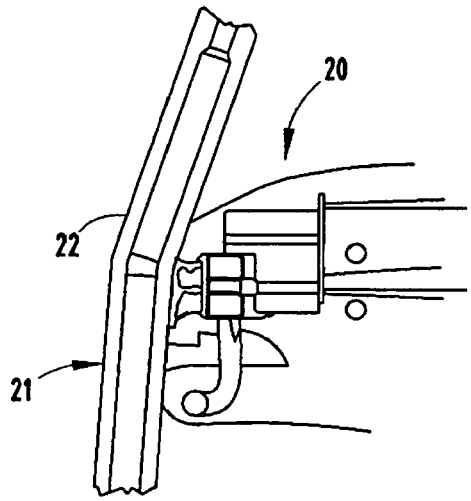
Figure 6:
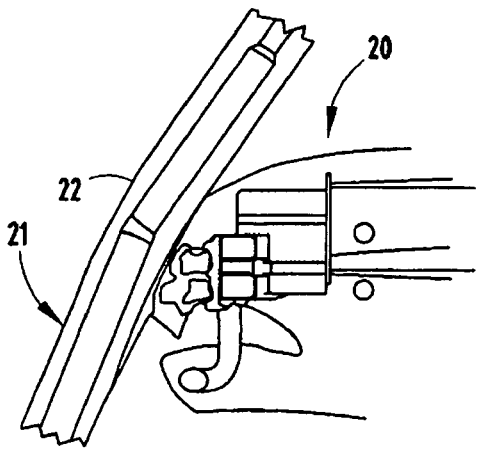
Figure 7:
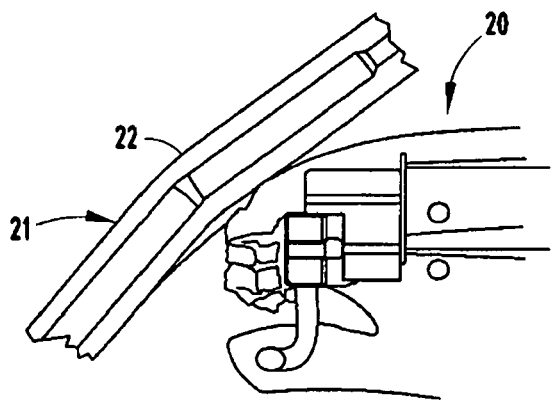

The thermoformed energy absorber 24 is made from a sheet of material, such as a thermoformable polyolefin. The absorber 24 has a plurality of deep-drawn longitudinally-elongated crush boxes 30 thermoformed from a base flange 32. The crush boxes 30 are up to about three inches deep, and as a result have side walls that are stretched when thermoformed. As a result, the center area has a relatively soft impact intended to reduce pedestrian injury in an accident, as shown in FIGS. 4–5. During further impact, the crush boxes 30 flex downwardly (or upwardly) and crush, which tends to throw the pedestrian's leg in a direction of least resistance. For example, in the illustrated example of FIG. 7, the pedestrian's torso has caused the leg to be rotated with the pedestrian's upper torso onto a hood of the vehicle. However, the present system allows the pedestrian's leg to move in any direction of least resistance, and may flex with a parallelogram motion to facilitate the transfer of energy from a horizontal direction toward a lateral, up, or down direction.

The energy absorber 24 (FIGS. 3–3A) has rows of box-shaped crush boxes 30 along its length, two high, and ten along its length. Each crush box 30 is formed from a base flange 32, and has a top wall 33, a bottom wall 34, and fore-aft-extending side walls 35 that extend from a front section or front wall 37 to the base flange 32. The walls 33–35 have a reduced thickness from the thickness of the base flange 32 due to being stretched when thermoformed (see FIG. 3A). At least some of the walls (see walls 35 in FIG. 3A) have a front portion 40 with a side thickness less than half of a thickness of the base flange 32. For example, where the base flange 32 is about 4 mm thick (the front wall 37 being similar in thickness), the side wall 35 will be about 1 mm thick at a forward location of the front portion 40 (i.e., near the front wall 37), and will be about 2.5 mm thick at a location near the base flange 32. This results in a relatively soft initial impact since the forward location of the front wall 37 has a relatively lower strength. The illustrated wall 35 has a tapered shape. It is noted that a shape of the wall can be affected by the thermoforming technique. For example, the thinnest area could be located near the base flange, if desired, by the type of thermoforming technique used. This is controlled by the type of die used (male mold, female mold, restricted or unrestricted material flow of the base flange) and by the material (e.g., material temperature, type of material and its inherent flow characteristics, etc). Also, the top and bottom walls 33—34 include at least two channel-like undulations 33', and the side walls 35 also include a channel-like undulation 35', which improve their strength and stability.

The illustrated bumper system 20 includes a "cow-catcher" shaped lower beam 50 held below the beam 23 by a pair of down arms 51. An aperture 52 is formed between the beams 50 and 23 and between the arms 51 for permitting air flow to a vehicle radiator and engine cooling system.

Figure 8:
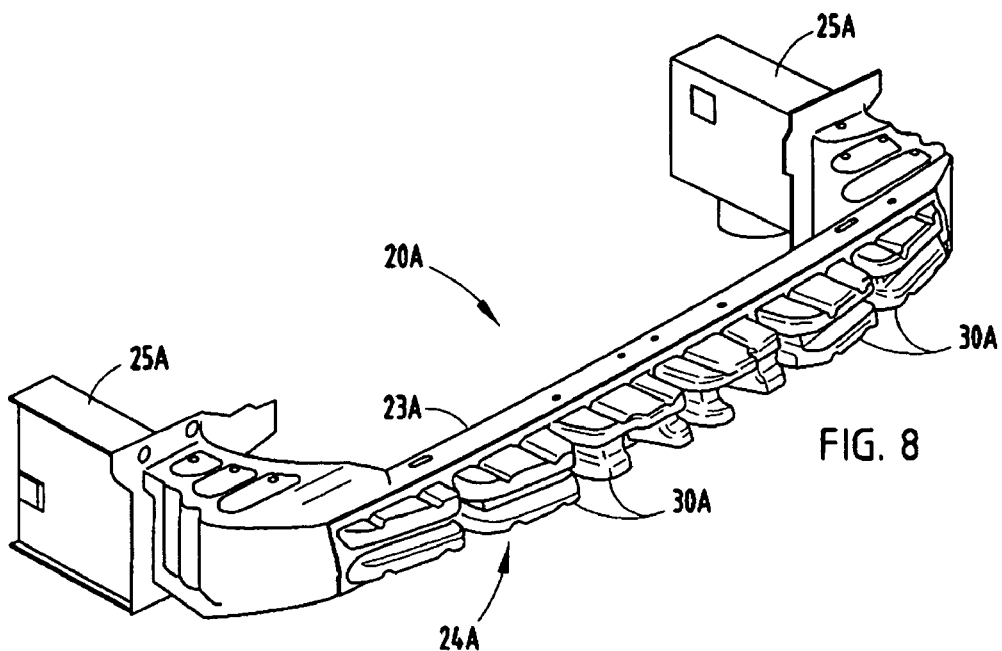
FIG. 8 is a perspective view of a modified bumper system, including an energy absorber modified to have a deeper center section and shallower end sections.
Figure 9:
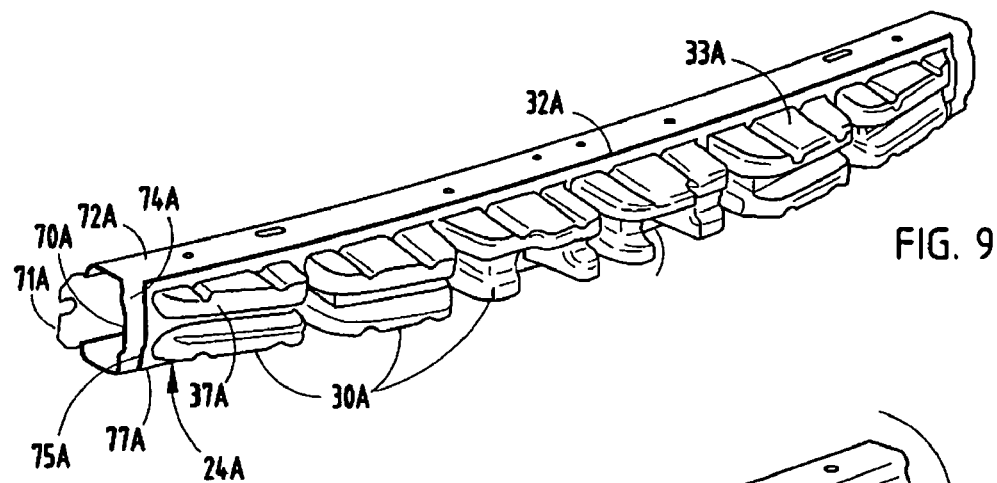
FIG. 9 is a perspective view of the bumper beam and energy absorber of FIG. 8.

A bumper system 20A (FIG. 8) includes components similar or identical to the bumper system 20, and similar numbers are used for identification with the addition of the letter "A". This is done to reduce redundant discussion.

Specifically, the vehicle bumper system 20A (FIG. 1), like bumper system 20, is configured to provide an improvement where pedestrian leg injury due to impact is reduced. The bumper system 20A includes a beam 23A and a thermoformed energy absorber 24A positioned on a face of the beam 23A. The beam 23A is mounted to a vehicle frame by mounts 25A, and the beam 23A and energy absorber 24A are configured to support fascia that aesthetically covers the vehicle front end.

Figure 10:
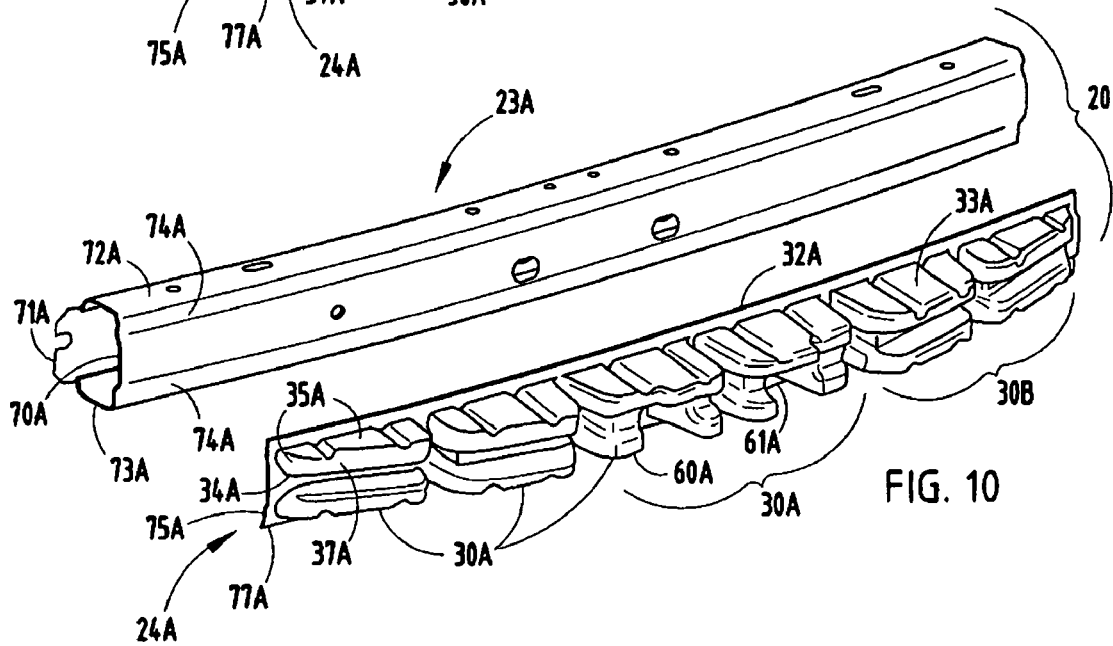
FIG. 10 is a perspective view similar to FIG. 9, but with the energy absorber exploded away.

The thermoformed energy absorber 24A is made from a sheet of material, such as a thermoformable polyolefin, and is thermoformed to form deep-drawn longitudinally-elongated crush boxes 30A that extend forward of the base flange 32A (FIG. 10). The crush boxes 30A in a center area of the energy absorber 24A are up to about three inches deep, and as a result, have side walls that are stretched when thermoformed. However, the crush boxes 30A at ends of the energy absorber 24A are only about one inch deep or less. The crush boxes in between the center and end crush boxes vary gradually from the deeper section of the center crush boxes 30A to the shallower crush boxes 30A. As a result, the center area has a relatively soft impact intended to reduce pedestrian injury in an accident, as shown in FIGS. 4–5. This allows the bumper system to have an aerodynamic shape, with a front of the vehicle having a greater curvature than the curvature of the beam 23A. During impact, the crush boxes 30A in the center area flex downwardly (or upwardly) and crush, which tends to throw the pedestrian's leg in a direction of least resistance. However, the present system allows the pedestrian's leg to move in any direction of least resistance, and may flex with a parallelogram motion to facilitate the transfer of energy from a horizontal direction toward a lateral, up, or down direction. At the corners, the crush boxes 30A are angled enough such that they tend to deflect the pedestrian toward a side of the vehicle, such that the bumper system 20A is still considered pedestrian friendly, even though the end sections of the energy absorber 24A are not as "soft" as the center section.

Like energy absorber 24, the energy absorber 24A (FIG. 10) has two rows of box-shaped crush boxes 30A along its length, two high, and (approximately) ten along its length. However, unlike energy absorber 24, the crush boxes are not all uniform in size and shape. Instead, they vary along the length, getting shorter as they near the end of the beam 23A. Also, the crush boxes 30A in a center area are irregularly shaped to match fascia aerodynamical shapes around the radiator air inlet opening. Also, the crush boxes 30A in the bottom row are not as high at location 60A as the crush boxes in the top row. Still further, the bottom crush boxes 30A have an area at locations 61A where the base flange 32A is enlarged and either not thermoformed or only slightly thermoformed. This can be for structural or aesthetic reasons.

The crush boxes 30A include a top wall 33A, a bottom wall 34A, and side fore-aft-extending side walls 35A that extend from a front section or front wall 37A to the base flange 32A. The walls 33A–35A have a reduced thickness from the thickness of the base flange 32A due to being stretched when thermoformed (see FIG. 3A), with deeper crush boxes having a greater reduction in thickness, and a more tapered section.

The illustrated beam 23A (FIG. 10) is tubular and has front, rear, top, and bottom walls 70A–73A that define a "D" shape, with the front wall 70A being relatively flat with two longitudinally-extending channels 74A. The energy absorber 24A includes rearwardly-formed protrusions 75A that engage the channels 74A to help retain the energy absorber on the beam 23A during an impact. Top and bottom edges of the base flange 32A potentially include flanges 76A and 77A that extend rearwardly onto top and bottom edges of the beam 23A, such as for frictionally temporary retention on the beam 23A.

Figure 11:
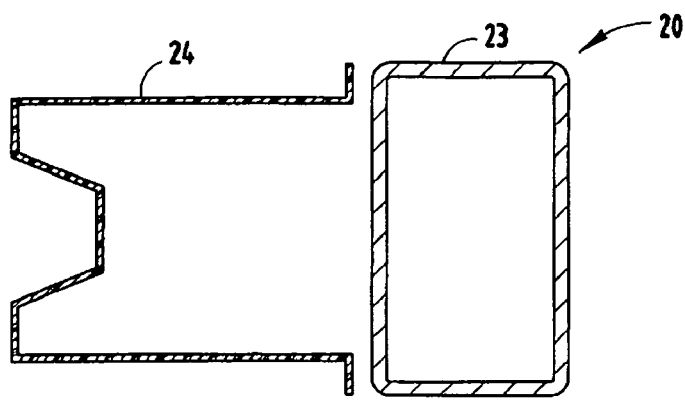
FIGS. 11–12 show a collapse of a thermoformed energy absorber.
Figure 12:
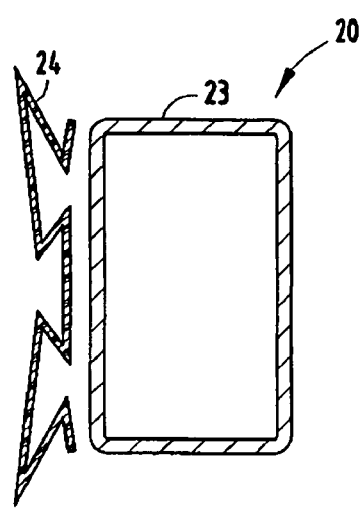
Figure 13:
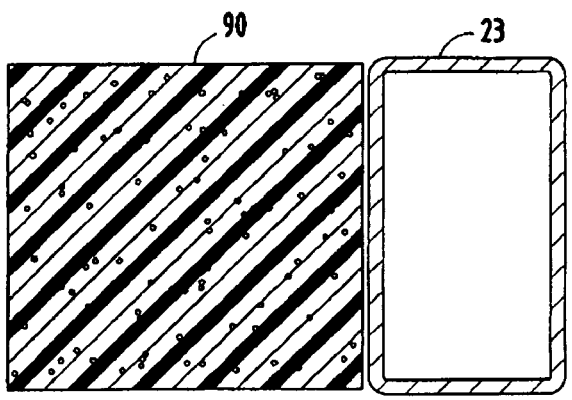
FIGS. 13–14 show a collapse of a foam energy absorber.
Figure 14:
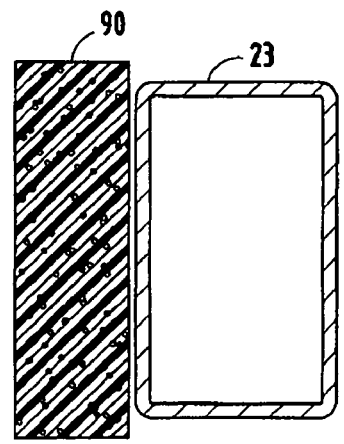

FIGS. 11–12 show a thermoformed energy absorber 24A before and after impact. It is noted that the total depth dimension of the energy absorber 24A after collapse is only two or three wall thickness in total thickness. This effectively results in a greater crush stroke than a foam energy absorber. For example, see FIGS. 13–14 which show a foam energy absorber 90 before and after crush. This energy absorber of FIGS. 11–12 is designed with very thin walls (such as 1 to 2 mm) and is essentially hollow, which allows it to compress fully down to about 1–2 mm material thickness. On a 100 mm thick thermoformed energy absorber, it will collapse allowing about 97 mm of impact stroke. On the foam energy absorber, it will collapse only about 60 mm to a final dimension of about 40 mm. This additional 37 mm of stroke (i.e., 97 mm minus 60 mm) can be used to reduce package size of the bumper system, or can be used for increased bumper stroke (which is important for pedestrian-friendly bumpers).

Figure 15:
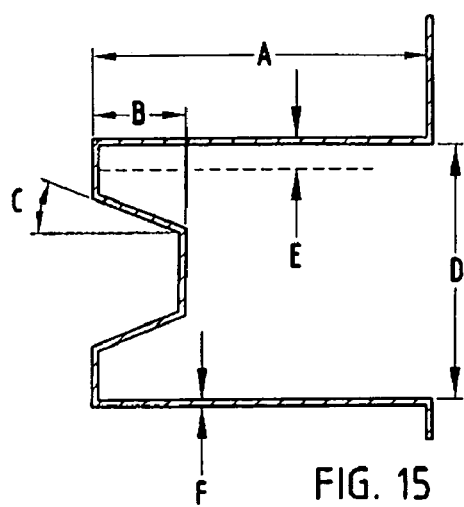
FIG. 15 shows an exemplary thermoformed energy absorber including various parameters that can be changed to control or affect energy absorption and energy management during impact.
Figure 16:
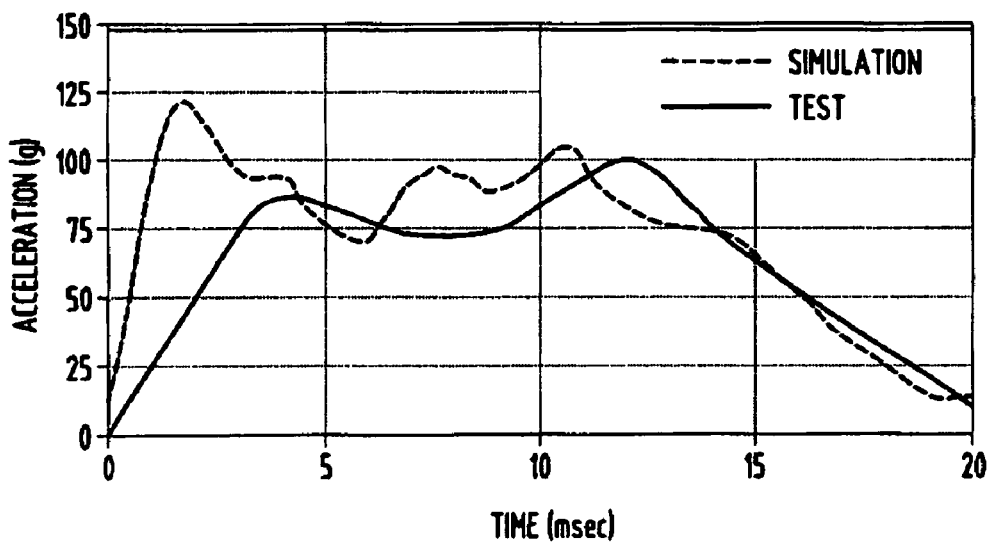
FIGS. 16–19 show graphs related to lower leg impacts.
Figure 17:
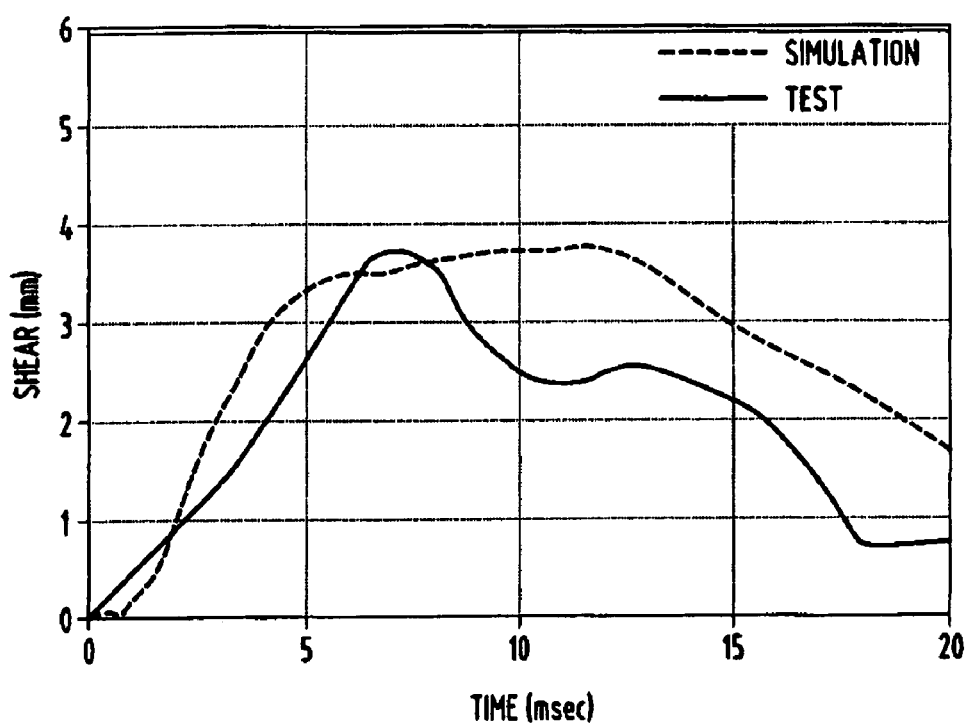
Figure 18:
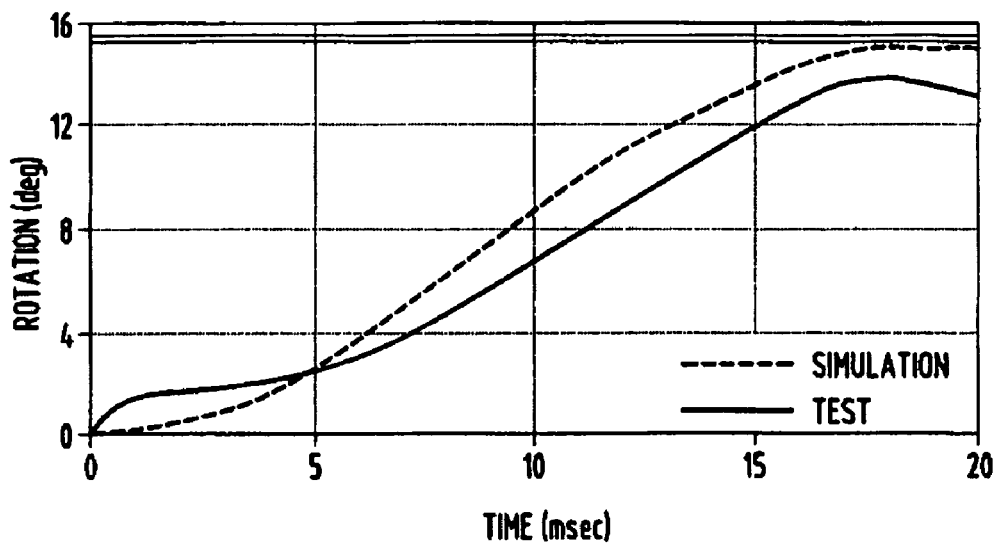
Figure 19:
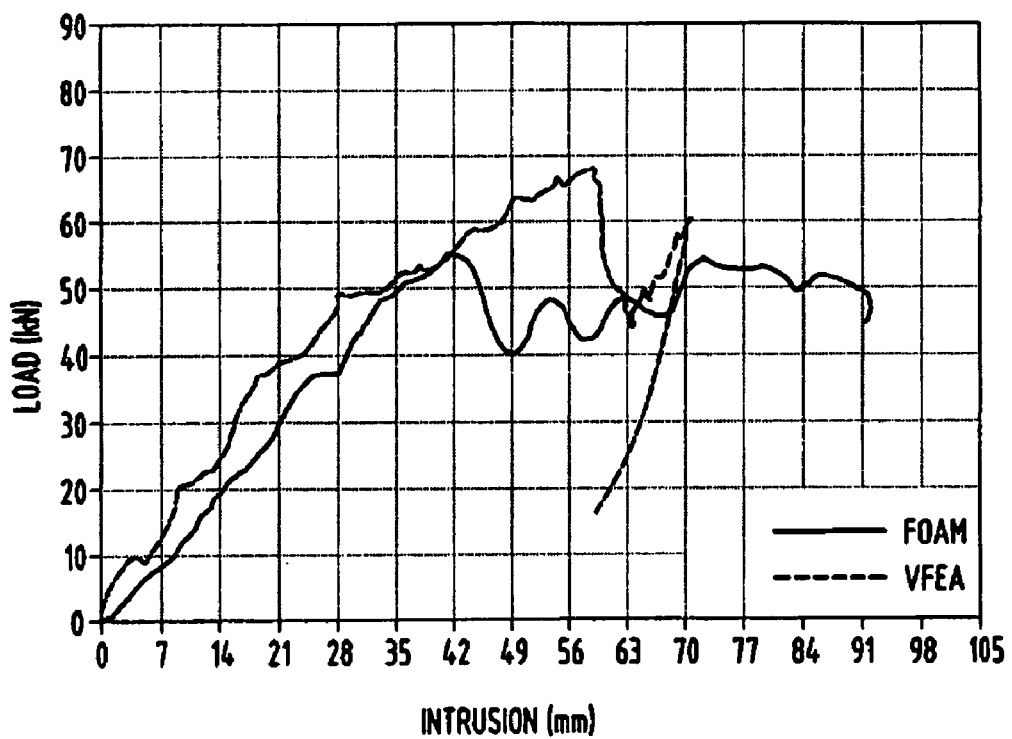
Figure 20:
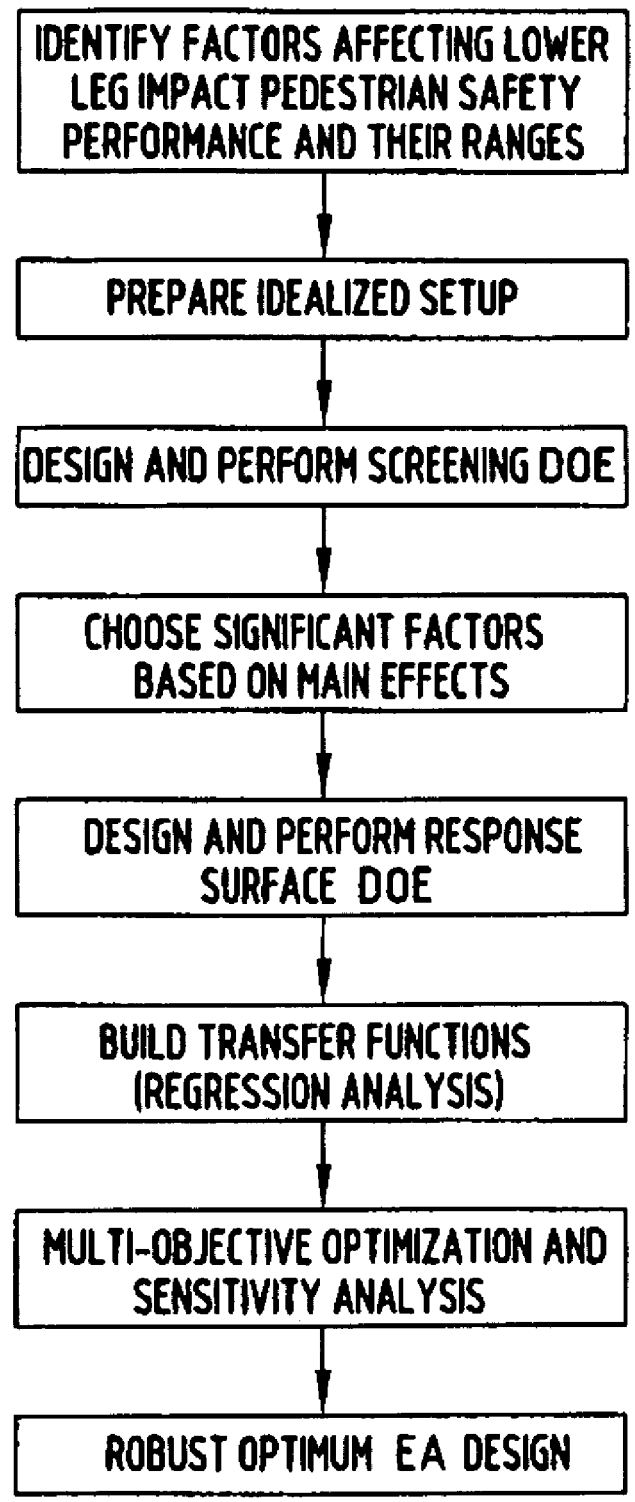
FIG. 20 discloses a designed experiment methodology.
Figure 21:
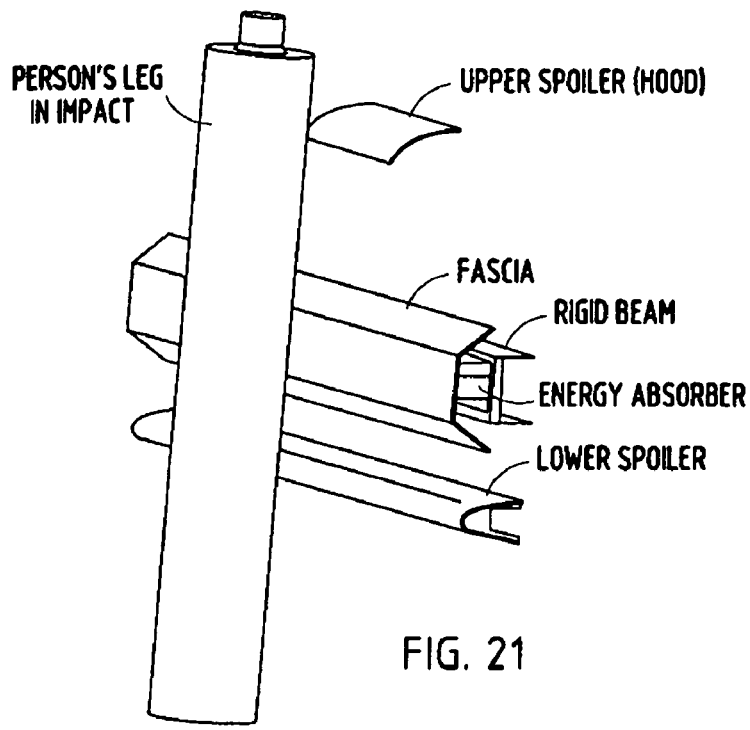
FIGS. 21–22 disclose variables in an energy absorber design.
Figure 22:
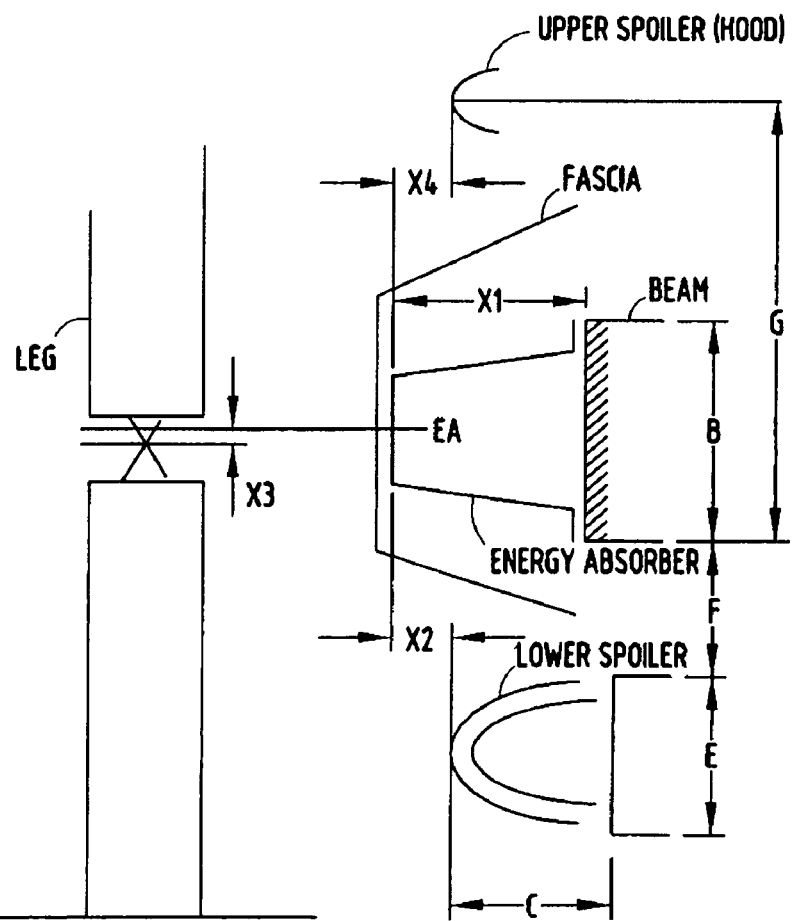

FIG. 15 shows the various factors that affect thermoformed energy absorption on a thermoformed energy absorber. It is noted that many if not all of these factors can be changed late in the bumper development program, and even changed during production (e.g., to accommodate late-required bumper styling changes or to allow fine-tuning of impact energy management of the bumper system). The illustrated absorber in FIG. 15 includes the following variables: A= energy absorber depth to adjust to specific package space, B= secondary load path corrugation depth for tuning acceleration pulse curve shape, C= face angle for tuning crush mode, E= corrugation depth to adjust initial stiffness, and F= material thickness to adjust stiffness and energy absorption capacity. In addition to primary pedestrian impact energy management, these variables allow the absorber to be tuned to various energy management levels to address other bumper system requirements, such as vehicle damage protection, air bag tuning, firm feel loading, and others.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A bumper system for vehicles comprising: p1 a beam; and
a thermoformed energy absorber positioned on a face of the beam, the thermoformed energy absorber having a base flange, and having a plurality of spaced-apart crush boxes thermoformed from the base flange, some of the crush boxes being near a center of the beam and being designed for center impact, and others of the crush boxes being near ends of the beam and having a different shape designed for corner impact, the crush boxes each including a front section spaced from the base flange and including top, bottom, and fore-aft-extending side walls that extend from the front section to the base flange, the walls having a reduced thickness due to being stretched when thermoformed, with at least some of the walls having a side thickness less than half of a thickness of the base flange.

2. The bumper system defined in claim 1, wherein the crush boxes near the center of the beam have a front portion on the fore-aft-extending side walls that is less than about half of a thickness of the base flange, and the crush boxes near the ends of the beam have a forward portion with a thicker cross section than the front portion of crush boxes near the center, such that the center area has a softer impact intended to reduce pedestrian injury during impact.

3. The bumper system defined in claim 1, wherein the crush boxes near the center have a fore/aft dimension of at least 3 inches deep.

4. The bumper system defined in claim 1, wherein the crush boxes near the ends have a fore/aft dimension of below 1 inch deep.

5. The bumper system defined in claim 1, wherein all side walls have a cross section that is tapered in a fore/aft direction.

6. The bumper system defined in claim 1, wherein at least some of the crush boxes are two times longer than wide.

7. The bumper system defined in claim 1, wherein the front wall defines a first sweep that is greater than a second sweep defined by the base flange.

8. A bumper system for vehicles comprising:
a beam; and a thermoformed energy absorber positioned on a face of the beam, the thermoformed energy absorber having a base flange, and having a plurality of spaced-apart crush boxes thermoformed from the base flange, the crush boxes each including a front section spaced from the base flange and including top, bottom, and fore-aft-extending side walls that extend from the front section to the base flange, some of the crush boxes being longitudinally-elongated to have a length at least three times a vertical dimension of the crush boxes, wherein the crush boxes near the center of the beam have a front portion on the fore-aft-extending side walls that is less than about half of a thickness of the base flange, and the crush boxes near the ends of the beam have a forward portion with a thicker cross section than the front portion of crush boxes near the center, such that the center area has a softer impact intended to reduce pedestrian injury during impact.

9. The bumper system defined in claim 8, wherein the crush boxes near the center have a fore/aft dimension of at least 3 inches deep.

10. The bumper system defined in claim 8, wherein the front wall defines a first sweep that is greater than a second sweep defined by the base flange.

11. A bumper system for vehicles comprising:
a beam; and
a thermoformed energy absorber positioned on a face of the beam, the thermoformed energy absorber having a base flange, and having a plurality of spaced-apart crush boxes thermoformed from the base flange, the crush boxes being longitudinally elongated to at least three times their width, some of the crush boxes being near a center of the beam and extending forward of the beam a first distance in height, and some of the crush boxes being near ends of the beam and extending forward of the beam a second distance in height, the first distance being at least double the second distance, the crush boxes each including a front section spaced from the base flange and including top, bottom, and fore-aft-extending side walls that extend from the front section to the base flange, the side walls having a non-constant thickness and being tapered in shape due to being stretched when thermoformed, the crush boxes near the center of the beam that are the first distance in height having a front portion of the fore-aft-extending walls that is less than about half of a thickness of the base flange, and the crush boxes near the ends of the beam that are a second distance in height having a thicker cross section than the crush boxes near the center, such that the center area has a softer impact intended to reduce pedestrian injury during impact.

* * * * *

UNITED STATES PATENT AND TRADEMARK OFFICE
CERTIFICATE OF CORRECTION

PATENT NO.        : 7,163,243 B2                                              Page 1 of 1
APPLICATION NO.   : 11/299927
DATED             : January 16, 2007
INVENTOR(S)       : Darin Evans It is certified that error appears in the above-identified patent and that said Letters Patent is hereby corrected as shown below:

Column 6, Claim 1, Line 12;
    "p1" delete.

Signed and Sealed this

Fifth Day of June, 2007

JON W. DUDAS
*Director of the United States Patent and Trademark Office*